No. 791,500.                                                              Patented June 6, 1905.

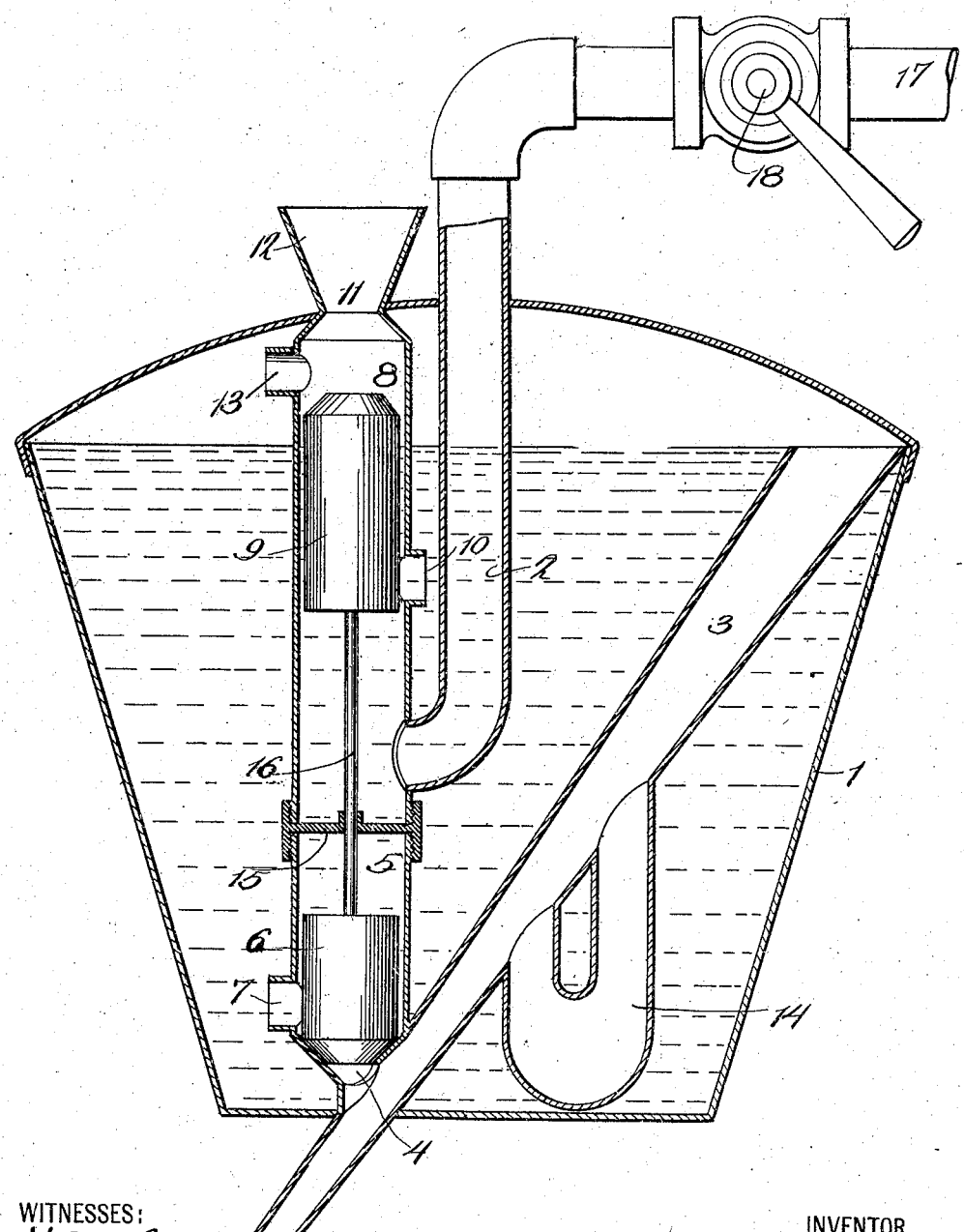

UNITED STATES PATENT OFFICE.

JOHN G. REILLY, OF NEW YORK, N. Y.

APPARATUS FOR SETTLING AND DRAWING OFF LIQUIDS.

SPECIFICATION forming part of Letters Patent No. 791,500, dated June 6, 1905.

Application filed April 13, 1904. Serial No. 202,970.

*To all whom it may concern:*

Be it known that I, JOHN G. REILLY, a citizen of the United States of America, residing at the city of New York, county of Kings, and State of New York, have invented certain new and useful Improvements in Apparatus for Settling and Drawing Off Liquids, of which the following is a specification, reference being had to the accompanying drawings, forming a part thereof.

My invention relates to apparatus for settling and drawing off liquids, and is particularly applicable to the drawing off of frothy liquids, such as new ale.

New ale when drawn directly from the cask runs from the faucet in the form of a thick foam with practically no solid liquid, and this thick foam takes quite a while to settle. It is customary, therefore, to draw a quantity of this foam into a vessel and allow the same to settle, so that when it is desired to serve the ale it may be poured carefully from the settling vessel. If the ale has stood too long a time in the settling vessel, it will be flat when thus served and requires to be freshened up by the admission of some fresh ale directly from the cask.

There are many objections to the foregoing system so generally in use. In the first place the settling vessel employed is usually a copper or glass jug, with its upper end opened to the atmosphere. Such a vessel is not only liable to get dirty from ordinary use, but foreign matter often falls into the liquid contained therein, contaminating same. Further, a large surface of the liquid is exposed while settling and is likely to become tainted from other causes. Again, the handling of ale by such a system consumes considerable time and entails confusion in a busy bar-room or café.

In my present invention I employ a closed settling vessel, which I connect directly to the ale-faucet or other liquid-delivery, and I provide the settling vessel with a discharge-passage having two openings or outlets, one at a relatively low level for the normal flow of the liquid, the other at a higher level constituting an overflow-outlet, and I further provide the settling vessel with an inlet located below the level of such overflow-outlet and provide an automatic valve arranged to be operated by liquid flowing into the vessel, said valve arranged to close normally the lower or main opening of said discharge-passage, but to open the same when liquid flows into the vessel. I further provide the said vessel with a gas-outlet which is closed automatically when liquid is flowing into the vessel, and sometimes I further provide the discharge-passage with a trap for catching any foam which may overflow into said discharge-passage.

I will now proceed to describe my invention with reference to the accompanying drawing, showing a central vertical section of one form of apparatus embodying my invention, and will then point out the novel features in claims.

The apparatus illustrated in the drawing comprises a closed vessel 1, having an inlet-pipe 2 secured to the top thereof and descending into the vessel and a discharge pipe or passage 3 secured to the bottom of the vessel and ascending from said bottom, usually to a point near the top of the vessel. The upper end of this discharge pipe or passage is open, forming an overflow-outlet. Near the bottom of the vessel said discharge-pipe has an opening 4, constituting the main discharge-opening, which opening connects said discharge-pipe with a valve-chamber 5, within which is a valve 6, arranged to seat in the bottom of said valve-chamber, and thereby prevent escape of liquid through opening 4. An opening 7 is provided for admitting liquid from the vessel 1 into valve-chamber 5.

Inlet-pipe 2 communicates with a chamber 8, containing a piston 9, connected to the valve 6, and in said chamber 8 is an opening 10, through which liquid flowing through pipe 2 may pass into the interior of vessel 1. The chamber 8 has at its top an opening 11 with a flaring discharge 12 terminating outside vessel 1, the portion of the chamber immediately beneath the opening 11 constituting a valve-seat, the valve for which is the upper end of the piston 9, which is correspondingly formed. Said chamber 8 is further provided with an opening 13, located at a point above the level of the overflow-outlet of passage 3, which opening connects the air-space near the top of the vessel 1 with the interior of piston-chamber 8.

A partition 15 separates chambers 5 and 8. The stem 16, connecting piston 9 and valve 6, passes through an orifice in this partition. Pipe 2 is connected to a supply-pipe 17, provided with a cut-off cock 18.

The operation of this apparatus is as follows: When first filling the vessel 1 with ale, upon admitting ale through the pipe 2 the vessel 1 fills with foam, owing to the amount of gas carried by the ale and the nature of the liquid. The foam in entering the vessel 1 raises the piston 9, closing the top outlet 11 and opening the bottom outlet 4. Some of the entering liquid may therefore escape through port 4 and pipe 3; but the ale enters the vessel 1, because of the gas-pressure behind it, much more rapidly than it can escape through opening 4, so that the vessel 1 will nevertheless fill. The attendant may catch in a suitable receptacle such ale as may run from the pipe 3 during the preliminary filling of the apparatus and may return it to the vessel 1 by pouring it into the funnel-mouth 12 after admission through the pipe 2 has been stopped by the closing of the cock. When the vessel 1 has filled with foam to such an extent that the foam begins to enter the pipe 3 at the top and escape through pipe 3 in considerable quantities, the attendant turns the supply-cock so as to cut off further admission of ale, and the valve 6 and piston 9 descend, closing port 4 and opening escape-opening 11. The foam in vessel 1 is then allowed to settle, air entering the vessel to supply the vacancy left by the settling of the foam through opening 11 and through the pipe 3. After a time more ale is admitted in the same manner and similarly allowed to settle, and this operation is continued until vessel 1 is filled with solid liquid to or nearly to the top of escape-pipe 3. The apparatus is then charged for regular operation. If now the cock connected to pipe 2 be opened to admit the gas-charged ale to vessel 1, the entering foam will raise the piston 9 and valve 6, permitting the solid ale to flow from vessel 1 through pipe 3, while the upper portion of said vessel above the solid liquid fills with foam, and the gas escaping from the liquid will pass off through pipe 3, mixing with the solid liquid discharged through port 4, so as to impart added "life" to the liquid drawn off. The vessel 1 being closed except for the opening through the discharge-pipe and the opening 11, the liquid within it will be protected from contamination.

It will ordinarily be necessary to return liquid from the pipe 3 into vessel 1 by pouring it into the funnel-mouth 12, as above described, only at rare intervals—as, for example, when starting up in the morning.

In the drawing I have shown the escape-pipe 3 as provided with a pocket or trap 14 to catch any liquid or foam which may trickle down the overflow-pipe.

It is obvious that the invention herein described is susceptible of many variations and modifications and that the form, construction, and arrangement of the automatic valves and inlet and discharge pipes may be varied without departing from the spirit and scope of my invention; but I do not limit myself to the particular details of combination, construction, and arrangement shown.

What I claim is—

1. The combination with means for supplying ale or similar gas-charged liquid, of settling apparatus comprising a settling vessel having an inlet-opening connected to said source of supply, an outlet-opening, and automatic valve means normally closing said outlet-opening regardless of the level of liquid in the vessel, and, including means for opening the same during flow of liquid into said vessel, said means operated by current action of flowing liquid to open the valve.

2. The combination with means for supplying ale or similar gas-charged liquid, of settling apparatus comprising a settling vessel having an inlet-opening connected to said source of supply, an outlet-opening, and automatic valve means normally closing said opening regardless of the level of the liquid in the vessel, and comprising means for opening said valve, arranged to be operated by the current action of liquid flowing into said vessel.

3. The combination with means for supplying ale or similar gas-charged liquid, of settling apparatus comprising a settling vessel having an outlet-opening, automatic valve means normally closing the same, and an inlet-passage connected to said source of supply and having an opening through which the liquid may flow into said vessel, said automatic valve means comprising an operating device located within said admission-passage and arranged to be operated by the current action of liquid flowing therethrough to open said valve, said means of greater specific gravity than the liquid, whereby the valve will be normally closed by gravity, regardless of the level of the liquid.

4. The combination with means for supplying ale or similar gas-charged liquid, of settling apparatus comprising a settling vessel having an outlet-passage provided with main and overflow outlet-openings, the latter located above the level of the former, and automatic valve means normally closing said main outlet-opening, but arranged to open the same during flow of liquid into said vessel.

5. The combination with means for supplying ale or similar gas-charged liquid, of settling apparatus comprising a settling vessel having an outlet-passage provided with main and overflow outlet-openings, the latter located above the level of the former, and automatic valve means normally closing said main outlet-opening and comprising means for opening said valve, arranged to be operated by the current of liquid flowing into said vessel.

6. The combination with means for supplying ale or similar gas-charged liquid, of settling apparatus comprising a settling vessel having an outlet-passage provided with main and overflow outlet-openings, the latter located above the level of the former, automatic valve means normally closing said main outlet-opening, and an inlet-passage connected to said source of supply and having an opening through which the liquid may flow into said vessel, said automatic valve means comprising an operating device located within said admission-passage and arranged to be operated by liquid flowing therethrough to open said valve.

7. In settling apparatus, the combination with a settling vessel having an outlet-opening, and an admission-passage for said vessel comprising a chamber provided with an opening through which liquid may flow into said vessel, of a valve normally closing said outlet-opening and a piston in said chamber connected to said valve and arranged to be operated to open the same by the action of liquid flowing through said admission-passage.

8. In settling apparatus, the combination with a settling vessel and an outlet-passage therefor provided with main and overflow outlet-openings, the latter at a higher level than the former, of a valve normally closing said main outlet-opening, an admission-passage comprising a chamber having an opening through which liquid may flow into said vessel, and a piston in said chamber connected to said valve and arranged to be operated to open the same by liquid flowing through said chamber.

9. In settling apparatus, the combination with a settling vessel having an outlet-opening, and an admission-passage, of a valve normally closing said outlet-opening, and a piston within said admission-passage, connected to said valve and arranged to be operated to open said valve by fluid flowing through said admission-passage.

10. In settling apparatus, the combination with a settling vessel, and a chamber therein having at its lower end a valve-seat and outlet-opening, and at its upper end a piston-chamber, and having a partition separating its upper and lower parts, of a valve in the lower portion of said chamber, a piston in the upper portion of said chamber, means connecting the valve and piston passing through said chamber, and an admission-passage connected to said chamber between said piston and partition.

11. In settling apparatus, the combination with a settling vessel having outlet-openings for liquid and gas and an inlet-opening, of valve means comprising operating means arranged to be operated by the flow of liquid into said vessel, said valve means arranged to close the liquid-outlet and open the gas-outlet, or vice versa.

12. In settling apparatus, the combination with a settling vessel having liquid and gas outlets, of a valve-chamber connected to the liquid-outlet, another chamber connected to the gas-outlet, an admission-passage connected to said second chamber, a valve in said valve-chamber, and operating means therefor located within said second chamber and arranged to be operated by entering fluid to open said valve and close said gas-outlet.

JOHN G. REILLY.

Witnesses:
H. M. MARBLE,
C. F. CARRINGTON.